United States Patent
Trim et al.

(10) Patent No.: US 11,210,059 B2
(45) Date of Patent: Dec. 28, 2021

(54) AUDIBLE COMMAND MODIFICATION

(71) Applicant: INTERNATIONAL BUSINESS MACHINES CORPORATION, Armonk, NY (US)

(72) Inventors: Craig M. Trim, Ventura, CA (US); Garfield W. Vaughn, South Windsor, CT (US); Shubhadip Ray, Secaucus, NJ (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 16/451,067

(22) Filed: Jun. 25, 2019

(65) Prior Publication Data

US 2020/0409656 A1 Dec. 31, 2020

(51) Int. Cl.
*G10L 21/00* (2013.01)
*G10L 25/00* (2013.01)
(Continued)

(52) U.S. Cl.
CPC ............ *G06F 3/167* (2013.01); *G06F 16/683* (2019.01); *G06N 20/00* (2019.01); *G10L 15/22* (2013.01); *G10L 2015/223* (2013.01)

(58) Field of Classification Search
None
See application file for complete search history.

(56) References Cited

U.S. PATENT DOCUMENTS 7,668,718 B2  2/2010 Kahn
8,620,652 B2 * 12/2013 Chambers ............... G10L 15/22
                                                704/231
(Continued)

FOREIGN PATENT DOCUMENTS

AU   2003272684 A1    4/2005
CN    107622652 A     1/2018
WO   2015169000 A1   11/2015

OTHER PUBLICATIONS

Caranica, A., Georgescu, L., Vulpe, A. et al. (2018). Multilingual Low-Resourced Prototype System for Voice-Controlled Intelligent Building Applications. World Conference on Information Systems and Technologies, pp. 97-107.

(Continued)

*Primary Examiner* — Satwant K Singh
(74) *Attorney, Agent, or Firm* — Schmeiser, Olsen & Watts; Brian M. Restauro

(57) ABSTRACT

A method and system for modifying an audible command is provided. The method includes continuously receiving audible commands associated with a context of interactions between a user and individuals. The audible commands are analyzed with respect to associated actions and user attributes of the audible commands are identified. Specified information required for executing each command of the audible commands and portions of the specified information associated with specified individuals of the individuals are determined. Digital audio samples of the user are retrieved and assigned to the portions of the specified information with respect to each command. The associated actions are modified with respect to the specified individuals and self-learning software code comprising the modified actions is generated and executed such that the commands are executed with respect to the modified actions.

20 Claims, 7 Drawing Sheets

(51) Int. Cl.
*G06F 3/16* (2006.01)
*G06N 20/00* (2019.01)
*G06F 16/683* (2019.01)
*G10L 15/22* (2006.01)

(56) References Cited

U.S. PATENT DOCUMENTS

| | | | | |
|---|---|---|---|---|
| 9,026,447 | B2* | 5/2015 | Geldbach | H04W 76/14 |
| | | | | 704/275 |
| 9,996,315 | B2* | 6/2018 | Barnes, Jr. | G06F 40/169 |
| 2005/0060417 | A1 | 3/2005 | Rose | |
| 2008/0301444 | A1 | 12/2008 | Kim | |
| 2011/0030067 | A1 | 2/2011 | Wilson | |
| 2016/0098577 | A1 | 4/2016 | Lacey | |
| 2017/0351330 | A1* | 12/2017 | Gordon | G06F 1/163 |
| 2018/0358015 | A1* | 12/2018 | Cash | G06F 3/167 |
| 2020/0118559 | A1* | 4/2020 | Huang | G10L 15/30 |
| 2020/0234711 | A1* | 7/2020 | Huang | G06F 40/30 |
| 2020/0293116 | A1* | 9/2020 | Udall | G06F 3/167 |

OTHER PUBLICATIONS

Consolvo, S., Smith, I. E., Matthews, T. et al. (2005) Location disclosure to social relations: why, when, & what people want to share. Proceedings of the SIGCHI conference on Human factors in computing systems, pp. 81-90.

Gaonkar, S., Li, J., Choudhury, R. R. et al. (2008,). Micro-blog: sharing and querying content through mobile phones and social participation. Proceedings of the 6th international conference on Mobile systems, applications, and services, pp. 174-186.

Shum, H. Y., He, X. D., & Li, D. (2018) From Eliza to Xiaolce: challenges and opportunities with social chatbots. Frontiers of Information Technology & Electronic Engineering, 19(1), pp. 10-26.

Mell, Peter et al.; "The NIST Definition of Cloud Computing;" National Institute of Standards and Technology; Special Publication 800-145; Sep. 2011; 7 pages.

* cited by examiner

US 11,210,059 B2

AUDIBLE COMMAND MODIFICATION

BACKGROUND

The present invention relates generally to a method audible command software functionality and in particular to a method and associated system for enabling software technology for identifying attributes of audible commands, modifying associated actions, and generating software code associated with the modified actions.

SUMMARY

A first aspect of the invention provides an audible command modification method comprising: continuously receiving, by a processor of an electronic device from a user, audible commands associated with a context of interactions between the user and a plurality of individuals; analyzing, by the processor, the audible commands with respect to associated actions associated with the context of interactions; identifying, by the processor executing machine learning code with respect to results of the analyzing, user attributes of the audible commands; determining, by the processor based the user attributes, specified information required for executing each command of the audible commands; determining, by the processor, portions of the specified information associated with specified individuals of the plurality of individuals; retrieving, by the processor, digital audio samples of the user; assigning, by the processor, the digital audio samples to the portions of the specified information with respect to each the command; modifying, by the processor based on results of the assigning, the associated actions with respect to the specified individuals; generating, by the processor, self-learning software code comprising the modified actions; and executing, by the processor, the self-learning software code such that the commands are executed with respect to the modified actions.

A second aspect of the invention provides a computer program product, comprising a computer readable hardware storage device storing a computer readable program code, the computer readable program code comprising an algorithm that when executed by a processor of an electronic device implements an audible command modification method, the method comprising: continuously receiving, by the processor from a user, audible commands associated with a context of interactions between the user and a plurality of individuals; analyzing, by the processor, the audible commands with respect to associated actions associated with the context of interactions; identifying, by the processor executing machine learning code with respect to results of the analyzing, user attributes of the audible commands; determining, by the processor based the user attributes, specified information required for executing each command of the audible commands; determining, by the processor, portions of the specified information associated with specified individuals of the plurality of individuals; retrieving, by the processor, digital audio samples of the user; assigning, by the processor, the digital audio samples to the portions of the specified information with respect to each the command; modifying, by the processor based on results of the assigning, the associated actions with respect to the specified individuals; generating, by the processor, self-learning software code comprising the modified actions; and executing, by the processor, the self-learning software code such that the commands are executed with respect to the modified actions.

A third aspect of the invention provides an electronic device comprising a processor coupled to a computer-readable memory unit, the memory unit comprising instructions that when executed by the processor implements an audible command modification method comprising: continuously receiving, by the processor from a user, audible commands associated with a context of interactions between the user and a plurality of individuals; analyzing, by the processor, the audible commands with respect to associated actions associated with the context of interactions; identifying, by the processor executing machine learning code with respect to results of the analyzing, user attributes of the audible commands; determining, by the processor based the user attributes, specified information required for executing each command of the audible commands; determining, by the processor, portions of the specified information associated with specified individuals of the plurality of individuals; retrieving, by the processor, digital audio samples of the user; assigning, by the processor, the digital audio samples to the portions of the specified information with respect to each the command; modifying, by the processor based on results of the assigning, the associated actions with respect to the specified individuals; generating, by the processor, self-learning software code comprising the modified actions; and executing, by the processor, the self-learning software code such that the commands are executed with respect to the modified actions.

The present invention advantageously provides a simple method and associated system capable of accurately modifying software functionality.

DETAILED DESCRIPTION

Figure 1:
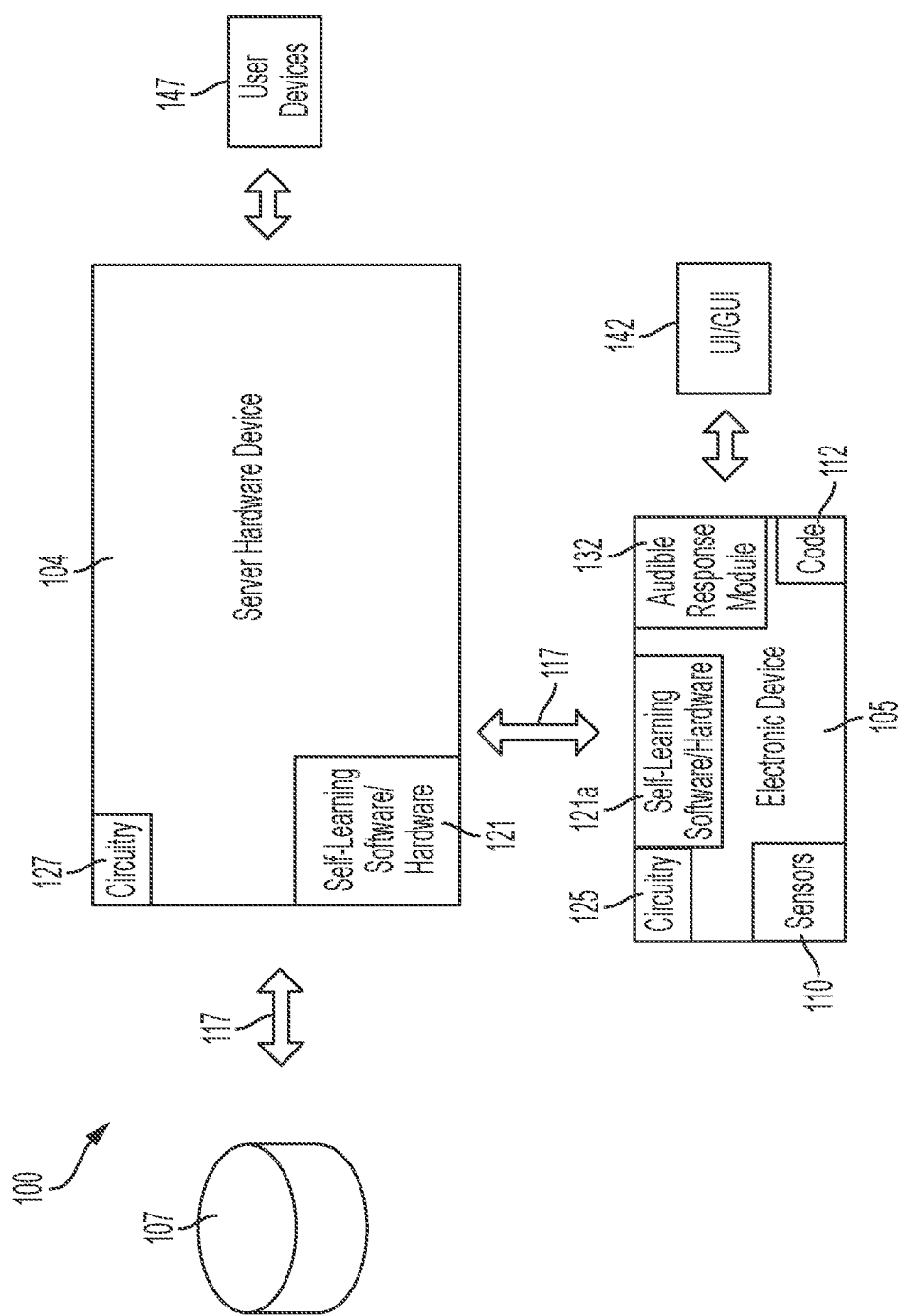
FIG. 1 illustrates a system for improving software technology for identifying attributes of audible commands, modifying associated actions, and generating software code associated with the modified actions, in accordance with embodiments of the present invention.

FIG. 1 illustrates a system 100 for improving software technology for identifying attributes of audible commands, modifying associated actions, and generating software code associated with the modified actions, in accordance with embodiments of the present invention. A typical software system may include processes associated with artificial intelligence (AI) to model the human interaction for performing multiple tasks such as, inter alia, customer services. Artificial intelligence processes may enable users to manage an array of functions/device such as, inter alia, connected cars, homes, etc. For example, users may submit voice commands to a variety of systems for performing a search or intent-based mapping and execute a user command on one or more devices. Over a period of time, the system may begin to detect user attributes such as user's preferences, common choices, and frequently requested commands. Likewise, in a multi-user discussion, many individuals may discuss many discussion topics that may or may not be associated with a voice command to a generate a response for the system. For example, many individuals may have gathered at a house of a mutual friend and a home automation system at the house may not have access to individual preferences of the invited friends. Likewise, a first user (friend A) may indicate that they want sugar in their coffee while another user (friend B) may indicate they want sugar in their coffee. Friend A and friend B have both have indicated a desire for an amount of sugar in their coffee and not having access to individual user preferences stored for the users disables the home automation system from quantify the seemingly equivalent commands with any exactitude. Therefore system 100 enables cognitive voice response functionality improvements for communicating within a multi-party discussions with the intent of quantifying commands that are underspecified, contradictory, etc.

System 100 is configured to improve a software command modification by:
1. Identifying commands that are underspecified but correctly and grammatically structured and complete.
2. Identifying potentially contradictory audible commands when semantical equivalence has been achieved.

System 100 enables the following software implemented functionality implementation example:

The example is enabled with respect to a multi-party discussion within an enterprise setting such that artificial intelligence (AI) based voice response systems of each participant of the multi-party discussion are in communication with each other with respect to a context of the discussion to gather additional information associated with respective participants for consideration during a process for constructing comprehensive voice commands or executing the voice command for each participant. For example, 8 coworkers are currently initiating a meeting and are instructed to configure interface software (on computing devices) for each participant but the software is only configured for a single participant. Therefore, the AI based voice response systems are configured to modify a self-learning configuration and rule (of the interface software) for each participant. For example:
1. A user (participant) A's voice response system indicates that he/she prefers a first configuration when working with another participant.
2. A user B's voice response system indicates a second configuration during a meeting.
3. A user C's voice response system indicates a third configuration during a specific time period.

Therefore, when all of the AI based voice response system communicate with each other, each voice response system will automatically detect a specified interface software configuration. Therefore, an enterprise automation system will configure the interface software for each participant.

Upon enabling the AI voice response systems to participate in the discussion, each AI based voice response system for each participant will identify a context of the discussion among the participants and accordingly only context specific information will be shared among the AI based voice response systems. Based on a participant's preference, some of the AI based voice response systems may be automatically disabled from participating in the communication. For example, an AI based voice response system of user A, may not participate in the discussion with an additional user's AI based voice response system if context is related to financial issues or real estate. Therefore, when an AI based voice response system identifies that participants are discussing issues related to a mutual fund, User A's voice response system will not provide any information related to User A during communications. Additionally, a user may generate security profile with respective devices.

A host AI based voice response system may transmit a digital id of all AI based voice response systems thereby allowing each AI based voice response system to share contextual information to each participants mobile device based on detected participants at the discussion. For example, if participants (A, B, C, D, E) are at a gathering and a conversation is related to a discussion associated with differing working hours, the system may present a suggestion to each participant with respect to specified working hours associated with multiple participants present at the gathering.

Based on a working relationship between any pair of users, the AI based voice response systems may maintaining similar working relationships while the AI based voice response systems are communicating with each other, and accordingly information sharing will additionally be maintained in a similar manner.

System 100 of FIG. 1 includes a server hardware device 104 (i.e., specialized hardware device), an electronic device 105 (including a UI/GUI 142), (additional) electronic devices 147, and a database 107 (e.g., a cloud-based system) interconnected through a network 117. Server hardware device 104 includes specialized circuitry 127 (that may include specialized software) and self-learning software code/hardware structure 121 (i.e., including self-learning software code). Electronic device 105 and electronic devices 147 may include personal devices provided to a user. Electronic device 105 and electronic devices 147 may be Bluetooth enabled to provide connectivity to any type of system. Electronic device 105 includes self-learning software code/hardware structure 121a (e.g., integrated with self-learning software code/hardware structure 121), specialized circuitry 125 (that may include specialized software), an audible (AI) response module 132, sensors 110, and code 112 (including configuration code and generated self-learning software code for transfer to/from server hardware device 104). Electronic devices 147 comprise the same hardware and software as electronic device 105. Sensors 110 may include any type of internal or external sensor (or biometric sensor) including, inter alia, ultrasonic three-dimensional sensor modules, a heart rate monitor, a blood pressure monitor, a temperature sensor, a pulse rate monitor, an ultrasonic sensor, an optical sensor, a video retrieval device, an audio retrieval device, humidity sensors, voltage sensors, etc. Server hardware device 104, electronic device 105, electronic devices 147, and database 107 may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server hardware device 104, electronic device 105, and electronic devices 147, and database 107 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-6. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving software technology for identifying attributes of audible commands, modifying associated actions, and generating software code associated with the modified actions. Network 117 may include any type of network including, inter alia, a local area network, (LAN), a wide area network (WAN), the Internet, a wireless network, etc. Alternatively, network 117 may include an application programming interface (API).

The following steps associated with system 100 describe an implementation process for improving software technology for generating software code associated with the modified actions. The process is initiated when users (of multiple audio sources) and respective commands from each of the users are identified via execution of machine learning code. Subsequently, artificial intelligence-based voice response systems are executed for fulfilling each respective command via usage of contextual information to determine an appropriate action for execution. Executing the artificial intelligence-based voice response systems may include:
1. Storing contextual information for audio content provided by each user. The contextual information may indicate: situation dependent facts, location, interactions with other users, and respective hardware/software health information.
2. Determining (via analysis of the stored contextual information) relationships between each user.
3. Identifying contextual information appropriate for contextual responses in response to receiving audio content that indicates a command from a user.
4. Determining whether additional users and previously determined relationships between the user and the additional users affect actions to fulfill the command.
5. Modifying actions executed to fulfil the command.
6. Fulfilling the command.

Additionally, a voice response system of the user is configured to verify contextual information. Likewise, unspoken information from each respective user is identified and actions taken to fulfill a respective command for the user based on the identified unspoken information are modified.

Figure 2:
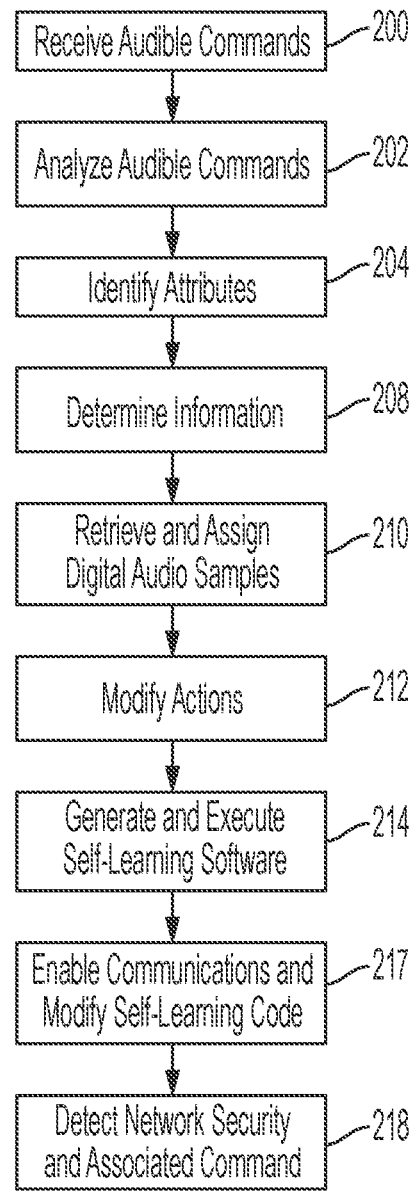
FIG. 2 illustrates an algorithm detailing a process flow enabled by the system of FIG. 1 for improving software technology for identifying attributes of audible commands, modifying associated actions, and generating software code associated with the modified actions, in accordance with embodiments of the present invention.

FIG. 2 illustrates an algorithm detailing a process flow enabled by system 100 of FIG. 1 for improving software technology for identifying attributes of audible commands, modifying associated actions, and generating software code associated with the modified actions, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server hardware device 104, user devices, and electronic device 105. In step 200, audible commands are continuously received by an electronic device from a user. The audible commands are associated with a context of interactions between the user and a plurality of individuals. Additionally, communications with a voice response system may be enabled to verify the context of interactions.

In step 202, the audible commands are analyzed with respect to associated actions associated with a context of interactions. In step 204, user attributes of the audible commands are identified with respect to results of the analysis of step 202. The user attributes may be associated with communication actions between the user and the plurality of individuals.

In step 208, specified information required for executing each command of the audible commands is determined based the user attributes. Additionally, portions of the specified information are determined. The portions are associated with specified individuals of the plurality of individuals. In step 210, digital audio samples of the user are retrieved and assigned to the portions of the specified information with respect to each command. In step 212, the associated actions are modified with respect to the specified individuals. Additionally, unspoken verbal information of each individual may be identified such that modifying the associated actions includes analyzing the unspoken verbal information. In step 214, self-learning software code comprising the modified actions is generated and executed with respect to the modified actions.

In step 217, communications between the electronic device and an additional electronic device of an additional user are enabled and in response, user specific information associated with the additional user with respect to the context of interactions is identified. Likewise, the self-learning software code is modified based on the user specific information associated with the additional user. In step 218, a network security level associated with the communications between the electronic device and the additional electronic device is detected. The user specific information is associated with a first audible command of the audible commands on the network security level.

Figure 3:
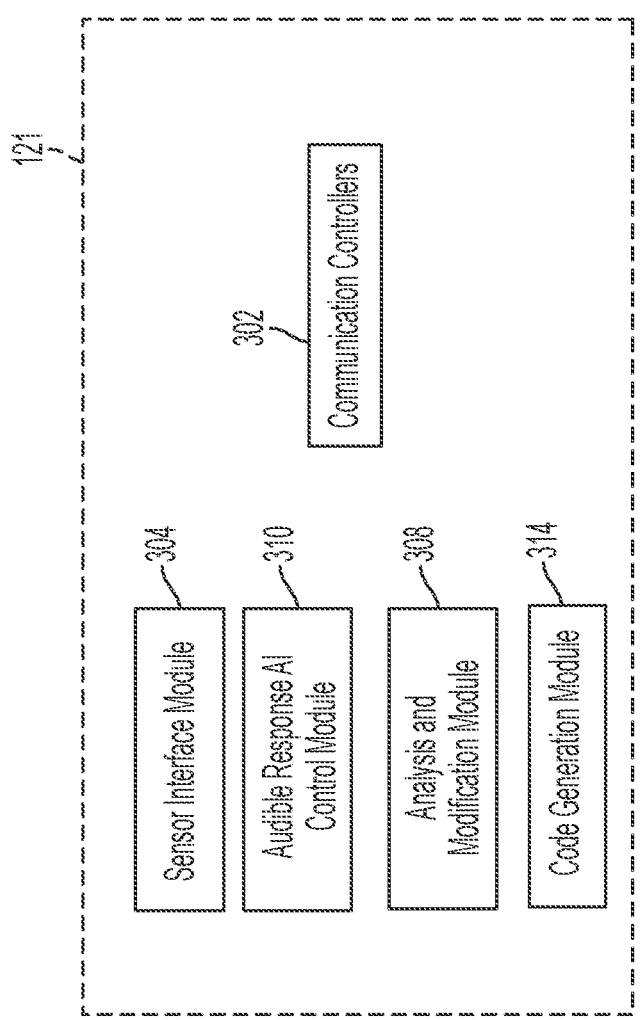
FIG. 3 illustrates an internal structural view of the self-learning software/hardware structure of FIG. 1, in accordance with embodiments of the present invention.

FIG. 3 illustrates an internal structural view of self-learning software/hardware structure 121 and/or self-learning software code/hardware structure 121a of FIG. 1, in accordance with embodiments of the present invention. Self-learning software/hardware structure 121 includes a sensor interface module 304, an audible response AI control module 310, an analysis and modification module 308, a code generation module 314, and communication controllers 302. Sensor interface module 304 comprises specialized hardware and software for controlling all functions related to sensors 110 of FIG. 1. Audible response AI control module 310 comprises specialized hardware and software for controlling all functionality related AI based voice response systems are configured to modify self-learning configuration and rules and implementing the process described with respect to the algorithm of FIG. 2. Analysis and modification module 308 comprises specialized hardware and software for controlling all functions related to the steps of FIG. 2. Code generation module 314 comprises specialized hardware and software for controlling all functions related to generating machine learning feedback for generating self-learning software code for executing audible commands and associated actions. Communication controllers 302 are enabled for controlling all communications between sensor interface module 304, audible response AI control module 310, analysis and modification module 308, and code generation module 314.

Figure 4:
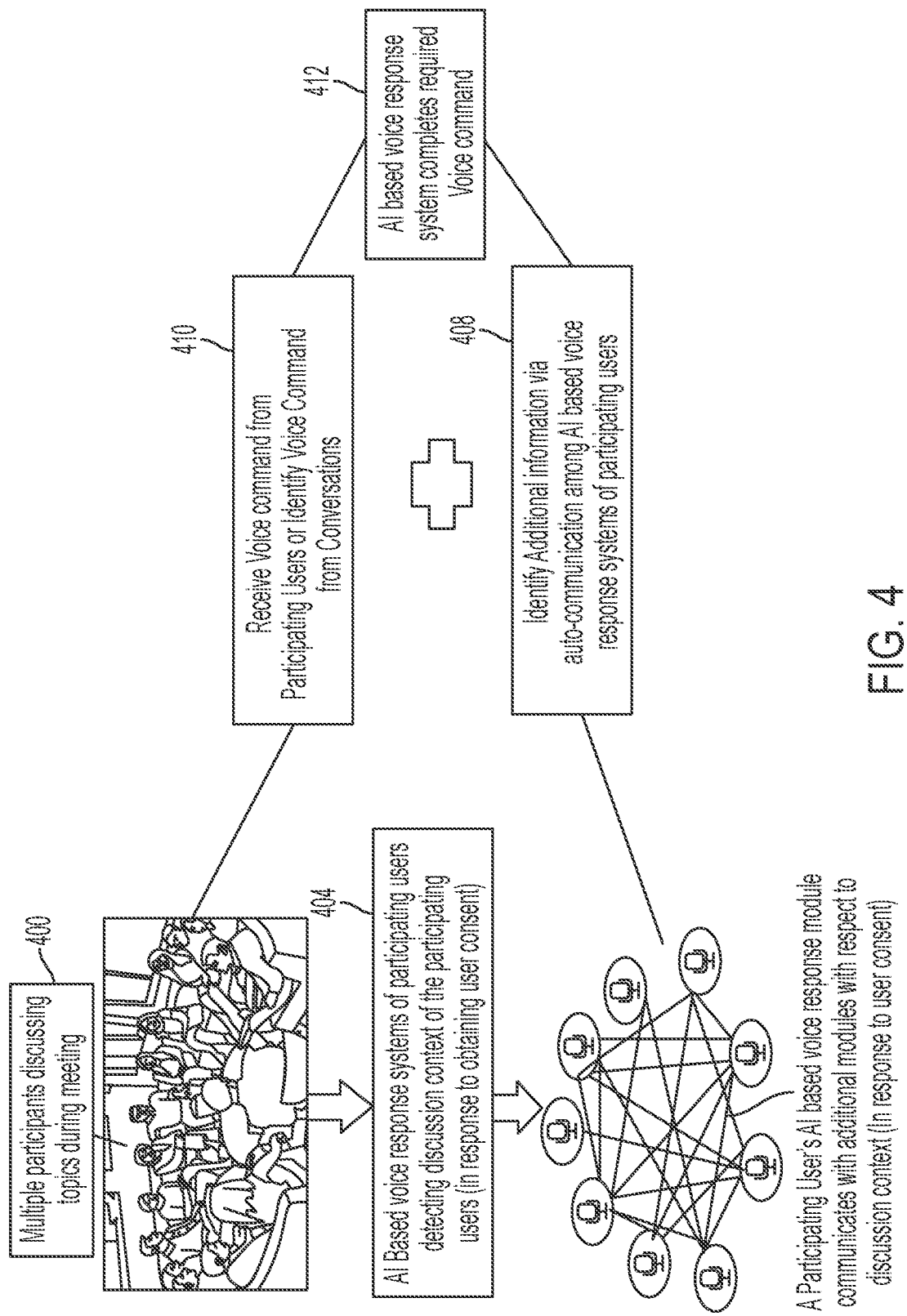
FIG. 4 illustrates an implementation example detailing an algorithm associated with a process for improving software technology associated with modifying audible commands, in accordance with embodiments of the present invention.

FIG. 4 illustrates an implementation example detailing an algorithm associated with a process for improving software technology associated with modifying audible commands, in accordance with embodiments of the present invention. The example illustrated in FIG. 4 is executed in step 400 with respect to simultaneous discussions between multiple users (e.g., an office meeting). In step 402, AI based voice response systems of each participating user detects (in response to obtaining user consent) a context of the discussion. In step 404, the participating user AI based voice response systems communicate with each other with respect to the context of the discussion. In step 408, additional information is identified in response to the communications of step 404. Additionally, in step 410, voice commands form the participating users are received and/or identified. In step 412, AI based voice response systems execute the voice commands based on feedback from the previous steps.

The following steps further detail the algorithm of FIG. 4:
1. Over a period of a time, an AI based voice response system of a user receives various voice commands with respect to differing contextual situations (e.g., a location, additional users, a user's health, etc.). Accordingly, the AI based voice response system identifies (based on execution of machine learning code) a user's choice, likes, dislikes, etc. with respect to various surrounding context, etc.
2. During a social network data or historical communication data analysis process, the AI based voice response system identifies a relationship strength or friendship bond related to different types of discussion topics.
3. During a historical data analysis process with respect to different types of voice commands and user specific information, the AI based voice response system identifies user specific information required for a specified type of voice command or discussion topic (e.g., office software types, travel preferences, etc.).
4. The AI based voice response system identifies what types of information may be shared with different types of users (e.g., a manager).
5. The AI based voice response system captures a voice sample to identify the user and sharable user specific information.
6. During a multi-user discussion scenario, the AI based voice response system identifies a context of the discussion and accordingly the AI based voice response systems auto connects with additional user voice response systems to identify the user specific information for the current context of discussion.
7. Based on the identified context and the level of identified security, the AI based voice response system communicates with the additional user voice response systems to identify the user's specific information to generate a voice command.
8. The AI based voice response system receives a voice command from the user simultaneously during a process associated with the additional AI based voice response system identifying unspoken information based on communications between all AI based voice response systems for generating the voice command.

Figure 5:
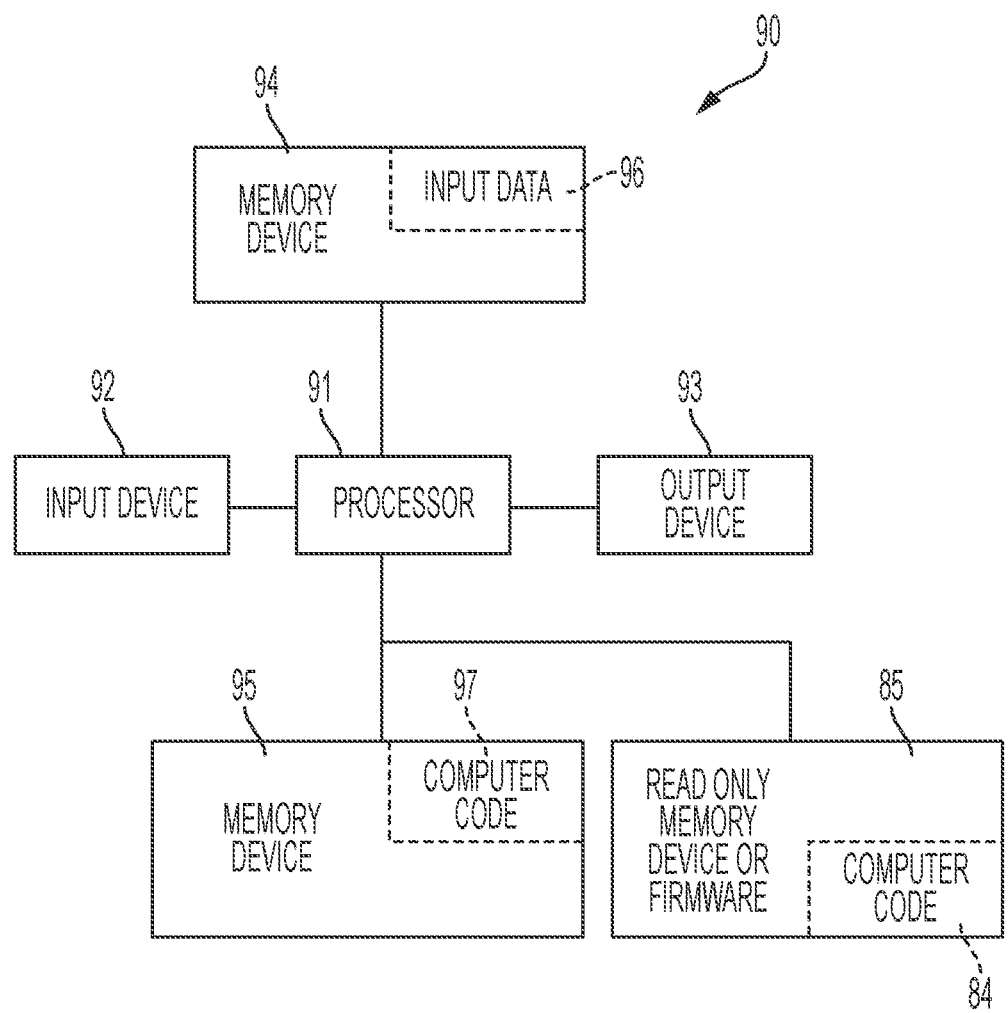
FIG. 5 illustrates a computer system used by the system of FIG. 1 for improving software technology for identifying attributes of audible commands, modifying associated actions, and generating software code associated with the modified actions, in accordance with embodiments of the present invention.

FIG. 5 illustrates a computer system 90 (e.g., electronic device 105, user devices 147, and/or server hardware device 104 of FIG. 1) used by or comprised by the system of FIG. 1 for improving software technology for identifying attributes of audible commands, modifying associated actions, and generating software code associated with the modified actions, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving software technology for identifying attributes of audible commands, modifying associated actions, and generating software code associated with the modified actions. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology for identifying attributes of audible commands, modifying associated actions, and generating software code associated with the modified actions. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology for identifying attributes of audible commands, modifying associated actions, and generating software code associated with the modified actions. In another embodiment, the invention provides a business method that performs the process steps of the invention on a subscription, advertising, and/or fee basis. That is, a service supplier, such as a Solution Integrator, could offer to enable a process for improving software technology for identifying attributes of audible commands, modifying associated actions, and generating software code associated with the modified actions. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a configuration of hardware and software, any configuration of hardware and software, as would be known to a person of ordinary skill in the art, may be utilized for the purposes stated supra in conjunction with the computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
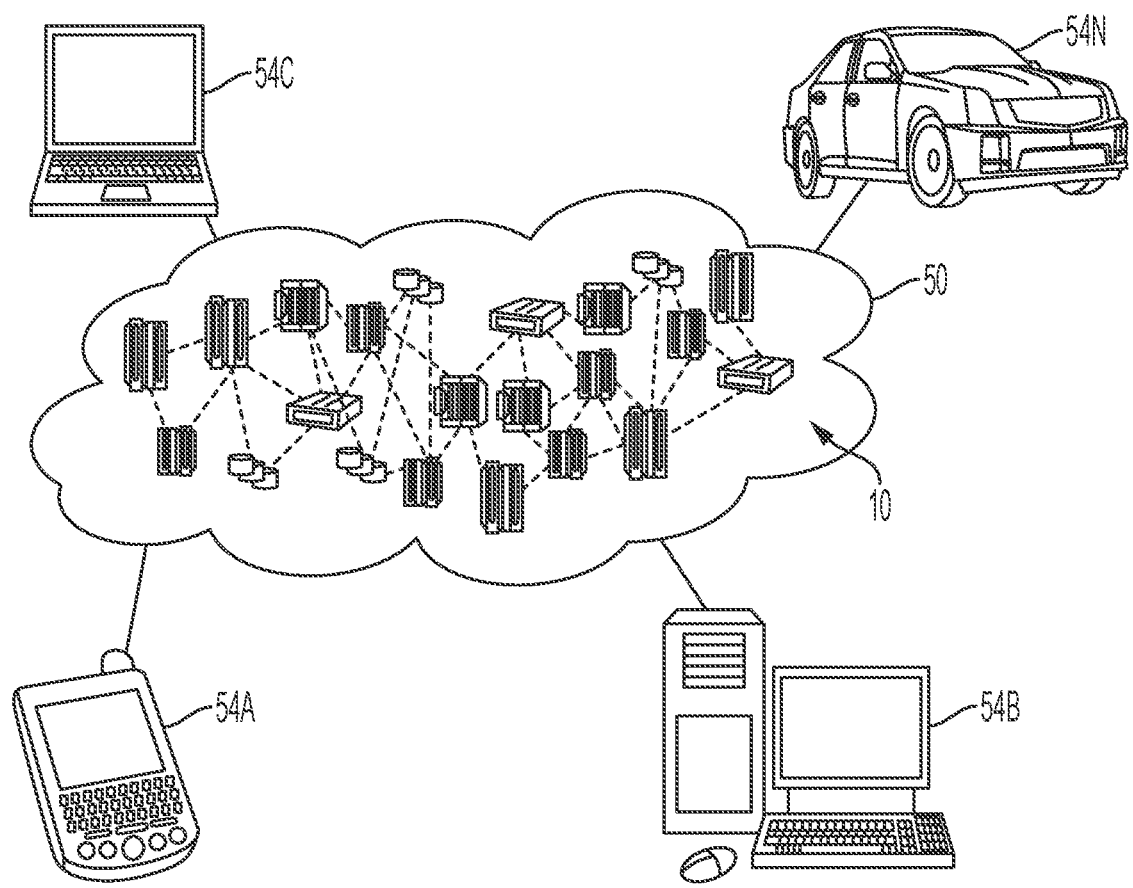
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
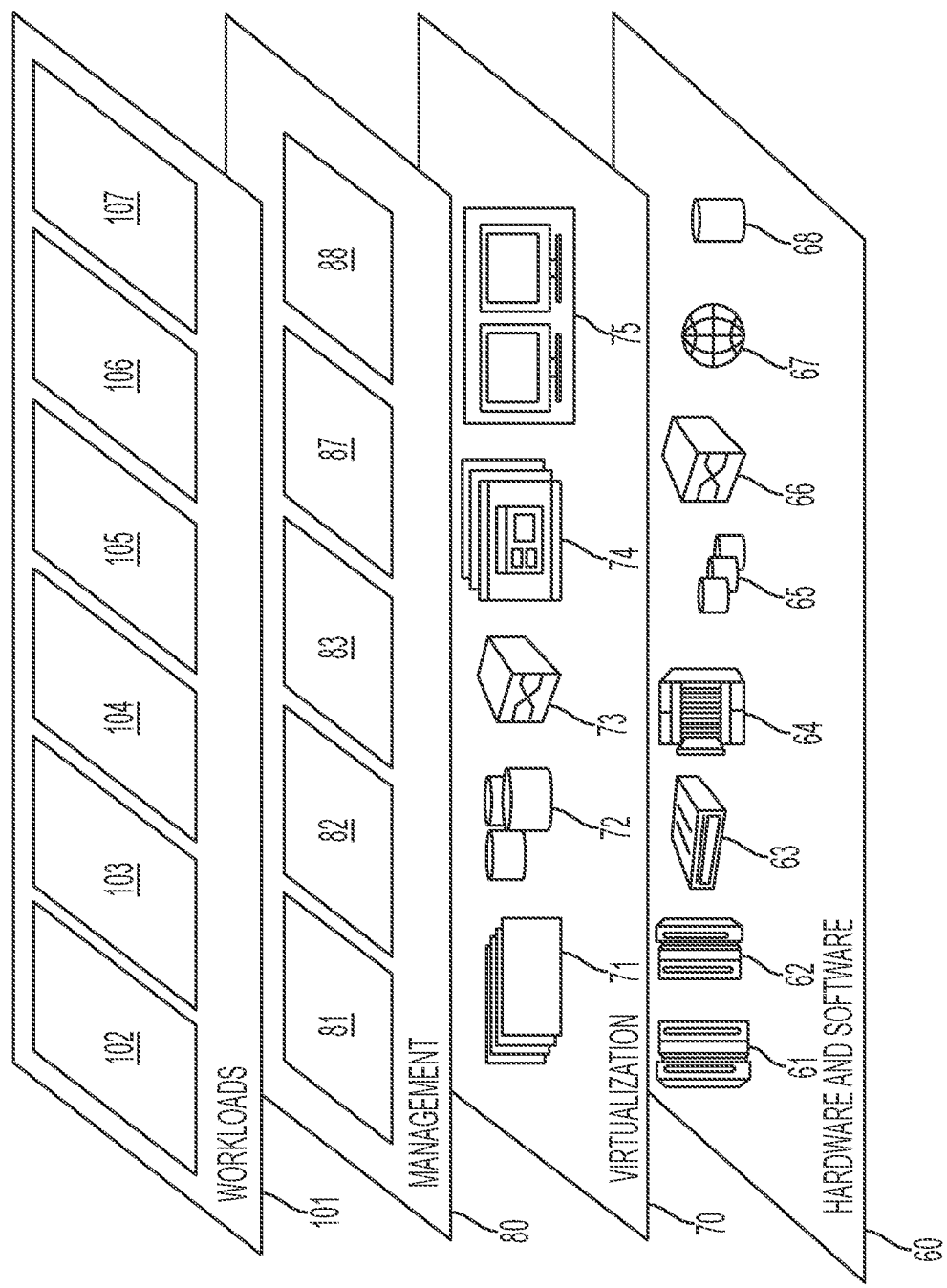
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and for improving software technology for identifying attributes of audible commands, modifying associated actions, and generating software code associated with the modified actions 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An audible command modification method comprising:
   continuously receiving, by a processor of an electronic device from a user, audible commands associated with a context of interactions between said user and a plurality of individuals;
   analyzing, by said processor, said audible commands with respect to associated actions associated with said context of interactions;
   identifying, by said processor executing machine learning code with respect to results of said analyzing, user attributes of said audible commands;
   determining, by said processor based said user attributes, specified information required for executing each command of said audible commands;
   determining, by said processor, portions of said specified information associated with specified individuals of said plurality of individuals;
   retrieving, by said processor, digital audio samples of said user;
   assigning, by said processor, said digital audio samples to said portions of said specified information with respect to each said command;
   modifying, by said processor based on results of said assigning, said associated actions with respect to said specified individuals;
   generating, by said processor, self-learning software code comprising said modified actions; and
   executing, by said processor, said self-learning software code such that said commands are executed with respect to said modified actions.

2. The method of claim 1, wherein said user attributes are associated with communication actions between said user and said plurality of individuals.

3. The method of claim 1, further comprising:
   enabling, by said processor, communications between said electronic device and an additional electronic device of an additional user of said plurality of individuals; and
   identifying, by said processor in response to said communications, user specific information associated with said additional user with respect to said context of interactions; and
   modifying, by said processor, said self-learning software code based on said user specific information associated with said additional user.

4. The method of claim 3, further comprising:
   detecting, by said processor, a network security level associated with said communications between said electronic device and said additional electronic device; and
   associating, by said processor based on said network security level, said user specific information with a first audible command of said audible commands.

5. The method of claim 1, further comprising:
   communicating, by said processor, with a voice response system of said hardware device to verify said context of interactions.

6. The method of claim 1, further comprising:
   identifying, by said processor, unspoken verbal information of each individual of said plurality of individuals, wherein said modifying said associated actions comprises analyzing said unspoken verbal information.

7. The method of claim 1, wherein said audible commands are associated with under specified and contradictory attributes.

8. The method of claim 1, further comprising:
   providing at least one support service for at least one of creating, integrating, hosting, maintaining, and deploying computer-readable code in the control hardware, said code being executed by the computer processor to implement: said continuously receiving, said analyzing, said identifying, said determining said specified information, said determining said portions, said retrieving, said assigning, said modifying, said generating, and said executing.

9. A computer program product, comprising a computer readable hardware storage device storing a computer readable program code, said computer readable program code comprising an algorithm that when executed by a processor of an electronic device implements an audible command modification method, said method comprising:
continuously receiving, by said processor from a user, audible commands associated with a context of interactions between said user and a plurality of individuals;
analyzing, by said processor, said audible commands with respect to associated actions associated with said context of interactions;
identifying, by said processor executing machine learning code with respect to results of said analyzing, user attributes of said audible commands;
determining, by said processor based said user attributes, specified information required for executing each command of said audible commands;
determining, by said processor, portions of said specified information associated with specified individuals of said plurality of individuals;
retrieving, by said processor, digital audio samples of said user;
assigning, by said processor, said digital audio samples to said portions of said specified information with respect to each said command;
modifying, by said processor based on results of said assigning, said associated actions with respect to said specified individuals;
generating, by said processor, self-learning software code comprising said modified actions; and
executing, by said processor, said self-learning software code such that said commands are executed with respect to said modified actions.

10. The computer program product of claim 9, wherein said user attributes are associated with communication actions between said user and said plurality of individuals.

11. The computer program product of claim 9, wherein said method further comprises:
enabling, by said processor, communications between said electronic device and an additional electronic device of an additional user of said plurality of individuals; and
identifying, by said processor in response to said communications, user specific information associated with said additional user with respect to said context of interactions; and
modifying, by said processor, said self-learning software code based on said user specific information associated with said additional user.

12. The computer program product of claim 11, wherein said method further comprises:
detecting, by said processor, a network security level associated with said communications between said electronic device and said additional electronic device; and
associating, by said processor based on said network security level, said user specific information with a first audible command of said audible commands.

13. The computer program product of claim 9, wherein said method further comprises:
communicating, by said processor, with a voice response system of said hardware device to verify said context of interactions.

14. The computer program product of claim 9, wherein said method further comprises:
identifying, by said processor, unspoken verbal information of each individual of said plurality of individuals, wherein said modifying said associated actions comprises analyzing said unspoken verbal information.

15. The computer program product of claim 9, wherein said audible commands are associated with under specified and contradictory attributes.

16. An electronic device comprising a processor coupled to a computer-readable memory unit, said memory unit comprising instructions that when executed by the processor implements an audible command modification method comprising:
continuously receiving, by said processor from a user, audible commands associated with a context of interactions between said user and a plurality of individuals;
analyzing, by said processor, said audible commands with respect to associated actions associated with said context of interactions;
identifying, by said processor executing machine learning code with respect to results of said analyzing, user attributes of said audible commands;
determining, by said processor based said user attributes, specified information required for executing each command of said audible commands;
determining, by said processor, portions of said specified information associated with specified individuals of said plurality of individuals;
retrieving, by said processor, digital audio samples of said user;
assigning, by said processor, said digital audio samples to said portions of said specified information with respect to each said command;
modifying, by said processor based on results of said assigning, said associated actions with respect to said specified individuals;
generating, by said processor, self-learning software code comprising said modified actions; and
executing, by said processor, said self-learning software code such that said commands are executed with respect to said modified actions.

17. The electronic device of claim 16, wherein said user attributes are associated with communication actions between said user and said plurality of individuals.

18. The electronic device of claim 16, wherein said method further comprises:
enabling, by said processor, communications between said electronic device and an additional electronic device of an additional user of said plurality of individuals; and
identifying, by said processor in response to said communications, user specific information associated with said additional user with respect to said context of interactions; and
modifying, by said processor, said self-learning software code based on said user specific information associated with said additional user.

19. The electronic device of claim 18, wherein said method further comprises:
detecting, by said processor, a network security level associated with said communications between said electronic device and said additional electronic device; and
associating, by said processor based on said network security level, said user specific information with a first audible command of said audible commands.

20. The electronic device of claim 16, wherein said method further comprises:

communicating, by said processor, with a voice response system of said hardware device to verify said context of interactions.

\* \* \* \* \*